United States Patent

Norton et al.

[15] 3,692,113
[45] Sept. 19, 1972

[54] OIL RECOVERY PROCESS USING POLYALKENE OXIDE POLYMER SOLUTIONS WITH ADDED CATIONS

[72] Inventors: Charles J. Norton, Denver, Colo. 80218; David O. Falk, Denver, Colo. 80236

[73] Assignee: Marathon Oil Company, Findlary, Ohio

[22] Filed: Oct. 9, 1970

[21] Appl. No.: 79,591

[52] U.S. Cl. ..............................166/275, 166/305 R
[51] Int. Cl. ...........................................E21b 43/22
[58] Field of Search..............166/275, 274, 273, 305; 252/8.55 D, 8.55 R

[56] References Cited

UNITED STATES PATENTS

| | | |
|---|---|---|
| 3,399,725 | 9/1968 | Pye..........................166/275 |
| 3,018,826 | 1/1962 | Sandiford..................166/273 |
| 3,343,601 | 9/1967 | Pye..........................166/275 |

*Primary Examiner*—Stephen J. Novosad
*Attorney*—Joseph C. Herring, Richard C. Willson, Jr. and Jack L. Hummel

[57] ABSTRACT

Oil is displaced from oil-bearing formations by injecting into the formations aqueous compositions which include polyalkene oxide polymers and controlled quantities of alkaline earth metal ions. Similar compositions can also be used as viscosity increasing ingredients in other applications.

8 Claims, 3 Drawing Figures

OIL RECOVERY PROCESS USING POLYALKENE OXIDE POLYMER SOLUTIONS WITH ADDED CATIONS

CROSS REFERENCES TO RELATED APPLICATIONS

The following cases relate processes the same general field as that of the present invention: U.S. Pat. No. 3,507,331; U.S. Pat. No. 3,467,187 Ser. No. 74,336 filed Sept. 22, 1970 Ser. No. 76,140 filed Sept. 29, 1970 Ser. No. 67,726 filed Aug. 28, 1970 Ser. No. 85,064 filed Oct. 29, 1970; Ser. No. 126,731 filed Feb. 22, 1971 Ser. No. 133,060 filed Mar. 12, 1971; Ser. No. 140,931 filed May 6, 1071; Ser. No. 209,479 filed Nov. 26, 1971.

BACKGROUND OF THE INVENTION

1. Field of the Invention

The present invention relates primarily to wells classified in class 166 of the United States Patent Office, and more particularly to a production of earth fluid by driving fluid classified in class 166 subclass 252.

2. Description of the Prior Art

Polyalkene oxides, e.g. polyethylene oxides, are described in the Union Carbide Corporation bulletins on their polyethylene oxide, Polyox , ( Registered trademark of the Union Carbide Co.) e.g. their Bulletin f–40246E, 10M–1968 Mixed polyethylene-polypropylene oxides are described in Wyandotte Chemical Company Bulletin f–3018R. Factors influencing mobility control by polymer solutions are discussed in Paper no. SPE 2867 of the Society of Petroleum Engineers of the American Institute of Mining Engineers, which paper also describes the screen viscometer and screen factor discussed later in this application.

However, none of the prior art, to the best of our knowledge, teaches the increased flow resistance of polyalkene oxides in aqueous solution in the presence of metal ions, as included within the present invention.

SUMMARY

General Statement of the Invention

Polyalkene oxide polymers have been used as "thickening agents" to increase the viscosity of liquids including among others, displacing liquids for use in primary, secondary, and tertiary petroleum recovery. Such uses are taught, e.g., in the American Institute of Mining Engineers' paper "Factors Influencing Mobility Control by Polymer Solution" by R. R. Jennings, J. H. Rogers, and T. J. West, SPE Paper No. 2867 prepared for the Ninth Biennial Production Techniques Symposium, held in Wichita Falls, Texas, May 14–15, 1970. Such polyalkene oxides decrease the mobility of the displacing liquids to improve their efficiency in displacing oil-in-place from formations and moving the oil toward production wells. Decreasing the mobility of the displacing fluids minimizes "fingering" or channelling of the displacement fluids through the body of oil-in-place in the formation.

A laboratory method for obtaining a measure of the relative mobility of fluids is described in the above paper by Jennings, it al.

FIG. 1 shows the general type of apparatus utilized in such testing. In the testing, the liquids flow through screens and the ratio of the time required for the test solution to flow through the "screen viscometer" divided by the time required for a standard solvent water to flow through the viscometer is termed the "screen factor."

According to the present invention, the "factor," of aqueous solutions of polyethylene oxide can be inexpensively and effectively increased by the addition of metal ions, preferably selected from the group consisting of alkaline earth metal ions. The present invention is useful with any of the general class of polyalkene oxides including polyethylene oxide, polypropylene oxide, mixed copolymers of polyethylene oxide and polypropylene oxide. The preferred polyalkene oxides have molecular weights of from about $10^4$ to about $10^8$, more preferably from $10^5$ to about $10^7$, and most preferably from $1.0 \times 10^6$ to about $6.0 \times 10^6$.

As mentioned above, the processes and compositions of the present invention are useful for the decreasing of mobility of liquid solutions especially for use in the secondary and tertiary recovery of petroleum by displacement of oil-in-place from subterranean oil-bearing formations. In general, the techniques of secondary and tertiary recovery are applicable to the use of the invention and standard works such as Secondary Recovery by C.R.Smith, (Reinhold, 1966) should be consulted in this connection.

DESCRIPTION OF THE PREFERRED EMBODIMENTS

Starting Materials

As mentioned above, the polyalkene oxides will preferably have molecular weights in the range of from about $10^4$ to about $10^8$ more preferably from $10^5$ to about $10^7$, and most preferably from $1.0 \times 10^6$ to about $6.0 \times 10^6$. Preferably, the polyalkene oxides will be present in amounts of from 0.001 to about 10.0, more preferably from 0.01 to about 1.0, and most preferably from 0.05 to about 0.5 weight percent based on the weight of the total solution.

The alkaline earth metal cations used in the present invention can be derived from salts of the corresponding metals, e.g., chlorides, bromides, nitrates, sulfates, chlorate, acetates, and borates. In general, any salt which is soluble in the aqueous solutions so as to provide sufficient concentration of the alkaline earth metal ions can be utilized with the invention. Typical examples include calcium salt, e.g. chloride, bromide, chlorate, nitrate, sulfate, and acetate.

While not narrowly critical, the amount of alkaline earth metal ion will generally be in the range of from 0.1 to about 300,000, more preferably from 10 to about 30,000, and most preferably from 100 to about 3,000 parts by weight of cation per million parts of solution.

The solvent for the liquid solutions of the present invention will comprise water, most preferably consist essentially of water. The water used with the present invention may be connate water, e.g., weakly saline Palestine line water, fresh water, or brackish water. It is preferably that the water contain less than about 300,000, more preferably less than about 10,000, and most preferably less than about 100 parts per million of dissolved solids, exclusive of their alkaline earth content.

While not necessary to the practice of the present invention various other ingredients including among others, cellulose and surfactants, e.g., polyalkylaryl sulfonates and other conventional displacement fluid additives may be added to the liquid polymer solutions. In addition to polyalkene oxides, other viscosity increasing agents, e.g., carboxymethyl cellulose, polyacrylamides, partially hydrolyzed polyacrylamides, polyvinylpyrollidones, and polysaccharides may be employed. Any of the afore-mentioned specific ingredients may be employed in admixture.

Preparation of Liquid Solutions

Figure 1:
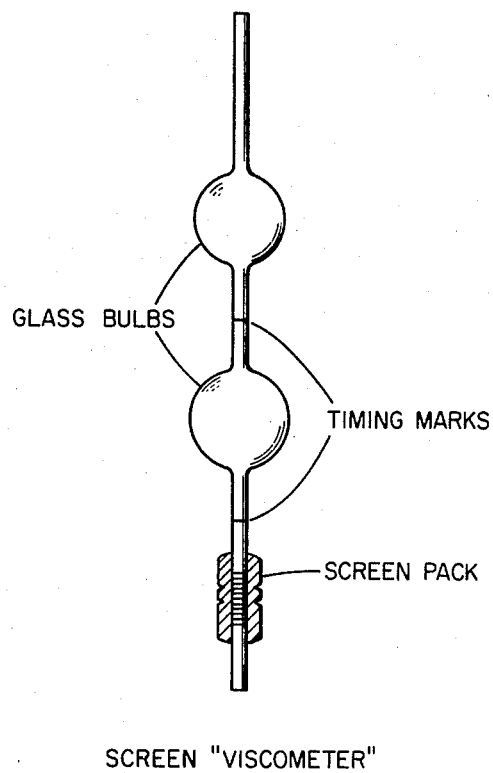
FIG. 1 is a schematic drawing of the screen viscometer utilized in the determination of screen factor.
Figure 2:
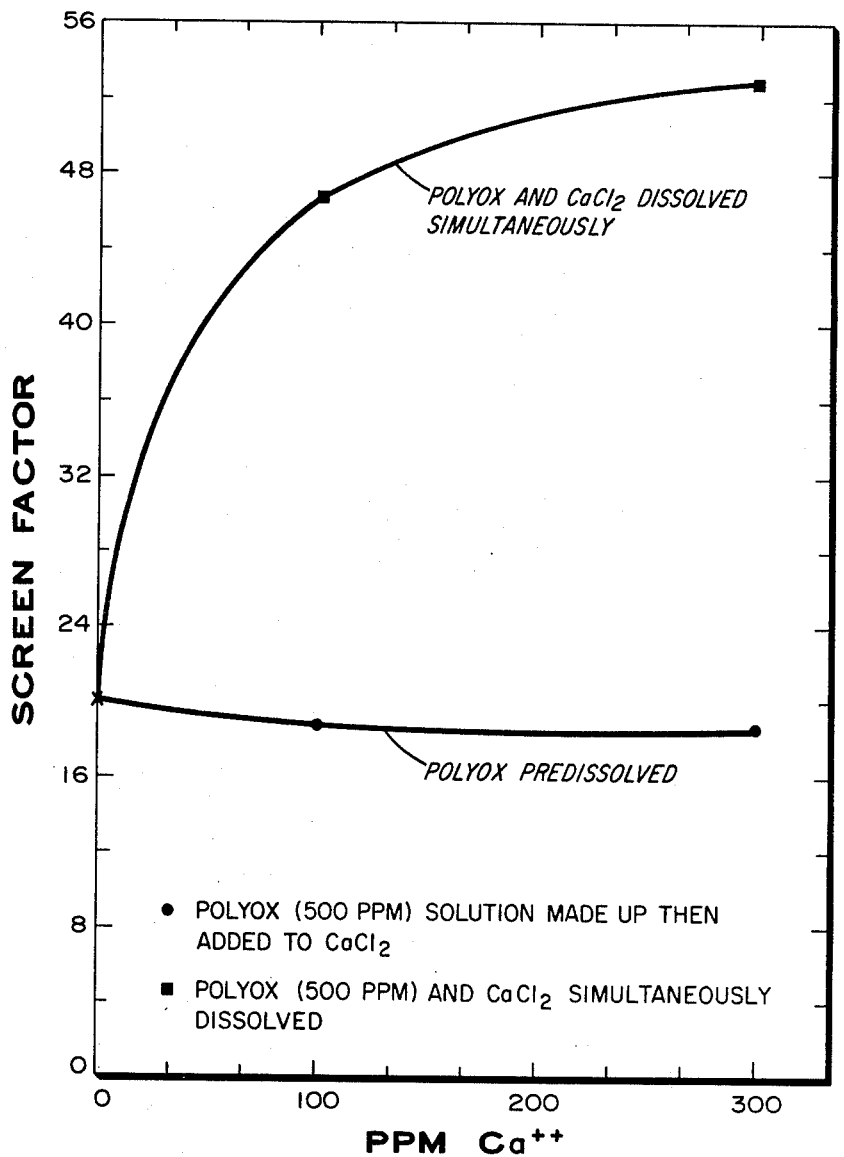
FIG. 2 is a plot of "screen factor" versus "Polyox" (500 ppm) concentration at various levels of parts per million of calcium ion. The two curves represent values when Polyox is predissolved and when Polyox and calcium chloride are dissolved simultaneously as described in Examples 1 to 4.
Figure 3:
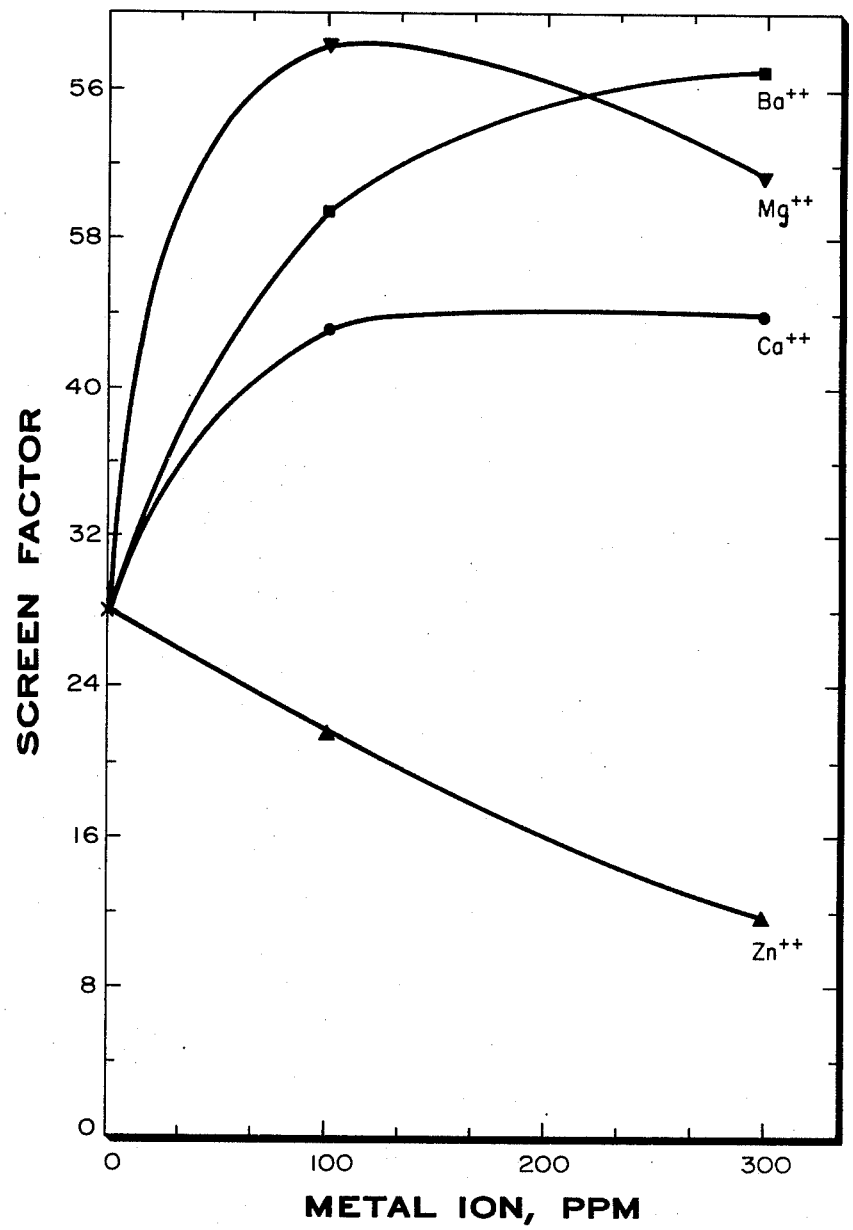
FIG. 3 is a plot of "screen factor" as a function of metal ion concentration (ppm) for $Ba^{++}$, $Mg^{++}$, $Ca^{++}$ and $Zn^{++}$, respectively.

In general, it is necessary that the polyalkylene oxide be dissolved either with or after the alkaline earth metal salt. As shown in FIG. 2, when the Polyox or other polyalkene oxide is dissolved and the salt thereafter added, virtually no increase in screen factor occurs. This difference in properties is the surprising feature of the invention. The ingredients may be readily dissolved into the water by adding the polyalkene oxide and salt (or first dissolving the salt) while gently stirring to promote dispersion and dissolving. The ingredients will preferably be mixed with temperatures somewhat above room temperature, more preferably from 0° C. to about 100° C., and most preferably from 20° to about 30° C. If desired, the mixing operation can be accomplished in one or more flow-type mixers or mixing tees so long as the properties of ingredients are properly measured and thoroughly mixed.

EXAMPLES

EXAMPLES I-IV

In the examples that follow, to minimize side effects, solutions are prepared by dissolving the polyalkene oxide specified in deionized water and simultaneously adding a sufficient quantity of the calcium chloride salt to provide the specified concentration of the metal. The solution compositions and properties are summarized in Table 1 which follows:

TABLE 1

| | [Ca$^{++}$] Conc. ppm | pH | Brookfield Viscosity 6 RPM | screen Factor |
|---|---|---|---|---|
| I. B56580-15-16-17 | 100 | 7.24 | 4.0 | 46.29 |
| Polyox (500 ppm) | 200 | 7.17 | 2.5 | 53.31 |
| deionized water added to dry Polyox and CaCl$_2$ tested after three days standing | 300 | 6.97 | 3.4 | 57.18 |
| II. B56584-1112-13 Repeat of B56580-15-16-17. Same solutions after standing five days and tested four times | 100 | 7.42 | | 28.73 |
| | 200 | 7.42 | | 25.81 |
| | 300 | 7.00 | | 36.81 |
| III. B56586-1-2-3-4-5 polyox (500 ppm) Polyox solution added to dry CaCl$_2$ dissolved and tested on same day | none | 7.78 | 3.6 | 20.00 |
| | 100 ppm | 7.67 | 3.5 | 18.78 |
| | 300 ppm | 7.61 | 3.5 | 18.46 |
| | 500 ppm | 7.72 | 3.6 | 18.98 |
| | 750 ppm | 7.85 | 3.6 | 18.91 |
| | 1000 ppm | 7.83 | 3.6 | 18.75 |
| IV. B56587-1-2 Repeat of B56580-15-17) New solutions. Deionized water added to dry Polyox and CaCl$_2$; Tested on same day | 100 ppm | 7.32 | 3.7 | 46.89 |
| | 300 ppm | 7.65 | 3.8 | 53.05 |
| | [Polyox] [Conc.] | | | |
| V. B56590-5-6 [Ca$^{++}$] (300 ppm) CaCl$_2$ solution added to dry Polyox Tested after one day standing | 100 | 6.94 | 2.1 | 16.78 |
| | 300 | 7.26 | 3.0 | 41.46 |
| | Polyox Conc. | | | |
| Polyox Standards | 100 | | 2.0 | 8.2 |
| | 250 | | 2.5 | 15.2 |
| | 500 | | 3.5 | 26.2 |

The screening factor effect is maximal when the Polyox is dissolved after or simultaneously with the calcium ion and least when the calcium ions are dissolved into predissolved Polyox. While the invention is not to be restricted to any hypothesized mechanism, apparently the alkaline earth ion forms a strong association complex with or between portions of the Polyox chains at the oxygen atoms.

EXAMPLE VI

A solution was prepared by simultaneous solution with slow stirring of 500 ppm Polyox (Union Carbide coagulant grade), 400 ppm sodium chloride, and 55 ppm calcium chloride. This clear solution had a Brookfield viscosity (at 6 rpm) of 318 and a screen factor of 42.9.

EXAMPLE VII

A 3 inch diameter, 4 ft long section of plastic encased Berea sandstone with 1070.0 cc pore volume, 0.208 porosity, and 323/md average permeability (pretreated by firing at 825° F) was saturated with two pore volume (PV) of Henry field water (water containing 11,500 ppm chloride, 6,500 ppm sodium, 276 ppm calcium, and 167 ppm magnesium). The wet core was then saturated with Henry crude oil to an initial oil saturation of 0.593 PV of initial water saturation of 0.407 PV, and subsequently secondarily flooded with 2 PV Henry water to a residual oil saturation of 0.358 PV and residual water saturation of 0.642 PV to simulate a conventional secondary recovery.

This prepared core was then flooded with the thickened aqueous solution prepared in Example VI, injected at from 20 to 40 cc/hour (frontal velocity of 1.8–3.7 ft/day). The recovery data at various injected pore volume throughputs of this solution are tabulated below:

| PV Throughput | Total Addition Crude Recovery, PV |
|---|---|
| 0.512 | 0.016 |
| 0.736 | 0.021 |
| 0.922 | 0.23 |
| 0.994 | 0.23 |

EXAMPLE VIII

When the solution prepared according to Example VI is injected into an injection well in an amount of approximately 0.1 pore volumes based on the total pore volume of the formation, oil-in-place is displaced away from the injection well and flows toward a production well from which it is produced. The "oil cut" is high indicating that little or no "fingering" or breakthrough of the displacement fluid into the production well exists.

Modifications

It should be understood that the invention is capable of a variety of modifications and variations which will be made apparent to those skilled in the art by a reading of the specification and which are to be included within the spirit of the claims appended hereto. Mixtures of various alkaline earth metal ion and polyalkene oxides can be employed.

What is claimed is:

1. In a process for the displacement of oil from oil-bearing formations comprising injecting into said formations aqueous compositions comprising from about 0.01 to about 1.0 weight percent of polyalkene oxide polymers, the improvement comprising increasing the screen factor of said aqueous compositions by adding to said compositions controlled quantities of alkaline earth metal ions, said controlled quantities being in the range of from about 10 to about 3,000 parts per million of said composition.

2. Processes according to claim 1 wherein the polyalkene oxide polymer has a molecular weight above 100,000 prior to the addition of said alkaline earth metal ions.

3. Processes according to claim 1 wherein the polyalkene oxide polymer is present in a concentration of from about 0.001 to about 5 percent be weight based on the weight of the water.

4. Processes according to claim 1 wherein the polyalkene oxide has a molecular weight of from 1,000,000 to about 10,000,000 prior to the addition of alkaline earth metal ions.

5. Processes according to claim 1 wherein said polyalkene oxide polymer has a concentration of 0.01 to about 1 percent by weight based on the weight of the water.

6. Processes according to claim 1 wherein the total composition of said alkaline earth metal ions is from about 10 to about 300,000 parts per million by weight based on the weight of the water.

7. Processes according to claim 1 wherein the polyalkene oxide comprises groups containing the structure:

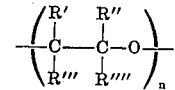

wherein R', R'', R''', and R'''' may be the same or different and are each selected from the group consisting of hydrogen, alkyl, and containing from one to 20 carbon atoms.

8. The Processes of claim 10 wherein R', R'', R''', and R'''' each contain from 1 to 6 carbon atoms, the balance of the substituents being hydrogen.

* * * * *